(12) United States Patent
Stroila

(10) Patent No.: US 8,723,886 B2
(45) Date of Patent: May 13, 2014

(54) GENERATING A MULTI-LAYERED GEOGRAPHIC IMAGE AND THE USE THEREOF

(75) Inventor: Matei Stroila, Chicago, IL (US)

(73) Assignee: Navteq B.V., Veldhoven (NL)

( * ) Notice: Subject to any disclaimer, the term of this patent is extended or adjusted under 35 U.S.C. 154(b) by 897 days.

(21) Appl. No.: 12/877,405

(22) Filed: Sep. 8, 2010

(65) Prior Publication Data

US 2012/0056899 A1 Mar. 8, 2012

(51) Int. Cl.
*G09G 5/00* (2006.01)

(52) U.S. Cl.
USPC ........... 345/629; 345/634; 345/427; 382/294; 382/295

(58) Field of Classification Search
None
See application file for complete search history.

(56) References Cited

U.S. PATENT DOCUMENTS

| | | | | |
|---|---|---|---|---|
| 4,472,732 A | * | 9/1984 | Bennett et al. ................. | 348/452 |
| 5,684,898 A | * | 11/1997 | Brady et al. ................... | 382/282 |
| 6,320,978 B1 | * | 11/2001 | Szeliski et al. ................ | 382/154 |
| 7,933,395 B1 | * | 4/2011 | Bailly et al. ............. | 379/201.04 |
| 8,503,762 B2 | * | 8/2013 | Ben Tzvi ....................... | 382/154 |
| 2006/0287819 A1 | * | 12/2006 | Brulle-Drews et al. ....... | 701/211 |
| 2008/0192053 A1 | * | 8/2008 | Howell et al. ................. | 345/427 |
| 2009/0087029 A1 | * | 4/2009 | Coleman et al. .............. | 382/103 |
| 2010/0007669 A1 | * | 1/2010 | Bethune et al. ............... | 345/520 |
| 2010/0283834 A1 | * | 11/2010 | Baker ............................. | 348/46 |
| 2011/0188760 A1 | * | 8/2011 | Wright et al. ................. | 382/203 |
| 2012/0177305 A1 | * | 7/2012 | Wu ................................ | 382/294 |
| 2012/0320057 A1 | * | 12/2012 | Gutierrez et al. ............. | 345/427 |

FOREIGN PATENT DOCUMENTS

JP 2005071337 A * 3/2005 ............... G08G 5/00

OTHER PUBLICATIONS

DAZ 3D, Developer Info. (Carrara), pp. 1-3, http://www.daz3d.com/i/software/carrara8/developer?_m=d (viewed on Sep. 30, 2010).
Jacob, "3D Animation in Flash." AccelerMedia, pp. 1-3, http://accelermedia.com/content/3d-animation-flash (Apr. 4, 2008).
VRM (Vector Rendering Method). History and Use, pp. 1-2, http://vrm.ao2.it (viewed on Sep. 30, 2010).
BlenderNation, PantoGraph: The Vector Renderer, pp. 1-2, http://www.blendernation.com/2008/03/03/pantograph-the-vector-renderer/ (viewed on Sep. 30, 2010).
3DPaintBrush, pp. 1-2, http://www.3dpaintbrush.com/content/detail.aspx (viewed on Sep. 30, 2010).

(Continued)

*Primary Examiner* — James A Thompson
*Assistant Examiner* — David H Chu
(74) *Attorney, Agent, or Firm* — Lempia Summerfield Katz LLC

(57) ABSTRACT

Systems, devices, features, and methods for generating and/or using a multi-layered image are disclosed. For example, a method of creating a multi-layered image from a three-dimensional model of a geographic area includes receiving three-dimensional graphical object data that represents a geographic area. The three-dimensional graphical object includes multiple geographic features. A first graphical layer of a first geographic feature of the three-dimensional graphical object is rendered as a first independent image layer. A second graphical layer of a second geographic feature of the three-dimensional graphical object is rendered as a second independent image layer. The first graphical layer and the second graphical layer are combined or overlaid to form the multi-layered image. Also, removal of layers may occur in a reverse order of their creation and/or may avoid causing gaps within the other layers not removed.

21 Claims, 7 Drawing Sheets

(56) References Cited

OTHER PUBLICATIONS

Right Hemisphere, Deep Exploration CAD Edition, pp. 1-2, http://www.righthemisphere.com/products/dexp/ (viewed on Sep. 30, 2010).

Strata, 3D Suite, pp. 1-3, http://www.strata.com/products/strata_3d_cx_suite/ (viewed on Sep. 30, 2010).

Electric Rain, Technology Available for Licensing, pp. 1-4, http://www.erain.com/Company/Technology/ (viewed on Sep. 30, 2010).

Owen, G. Scott, "Visible Surface Determination: Painter's Algorithm," pp. 1-8, http://www.siggraph.org/education/materials/HyperGraph/scanline/visibility/painter.htm (Last changed May 13, 1998).

Electric Rain, Swift 3D MAX, pp. 1-3, http://www.erain.com/Products/Plug-ins/ (viewed on Sep. 30, 2010).

* cited by examiner

GENERATING A MULTI-LAYERED GEOGRAPHIC IMAGE AND THE USE THEREOF

BACKGROUND OF THE INVENTION

The present invention relates to graphics, images, and/or image data and, more particularly, to generating one or more images or graphics data from geographic model(s) or information and/or the use thereof.

Navigation systems or devices may provide useful guidance or route information. For example, an end user navigation device may provide a display of a route and/or directions from an origin to a desired destination. Such navigation devices may use or rely on a geographic database that includes geographic data records representing a geographic region.

To help guide end users, a navigation device or program thereof, for example, may display images or views to depict respective areas about a route or point thereof. However, such display features may be limited in regards to configuration options. Also, possible modification of the display features for different configurations may require undesired processing and/or undesired memory storage, such as for developing the different configurations. Accordingly, enhancements in producing and using graphics images, such as for navigation or geographic views, with more flexible configuration options and/or in a more efficient manner may be desired.

SUMMARY OF THE INVENTION

According to one aspect, a method of creating a multi-layered image from a three-dimensional model of a geographic area is provided. For example, the method includes receiving three-dimensional graphical object data that represents a geographic area. The three-dimensional graphical object includes multiple geographic features. A first graphical layer of a first geographic feature of the three-dimensional graphical object is rendered as a first independent image layer. A second graphical layer of a second geographic feature of the three-dimensional graphical object is rendered as a second independent image layer. The first graphical layer and the second graphical layer are combined or overlaid to form the multi-layered image. Also, removal of layers may occur in a reverse order of their creation and/or may avoid causing gaps within the other layers not removed.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
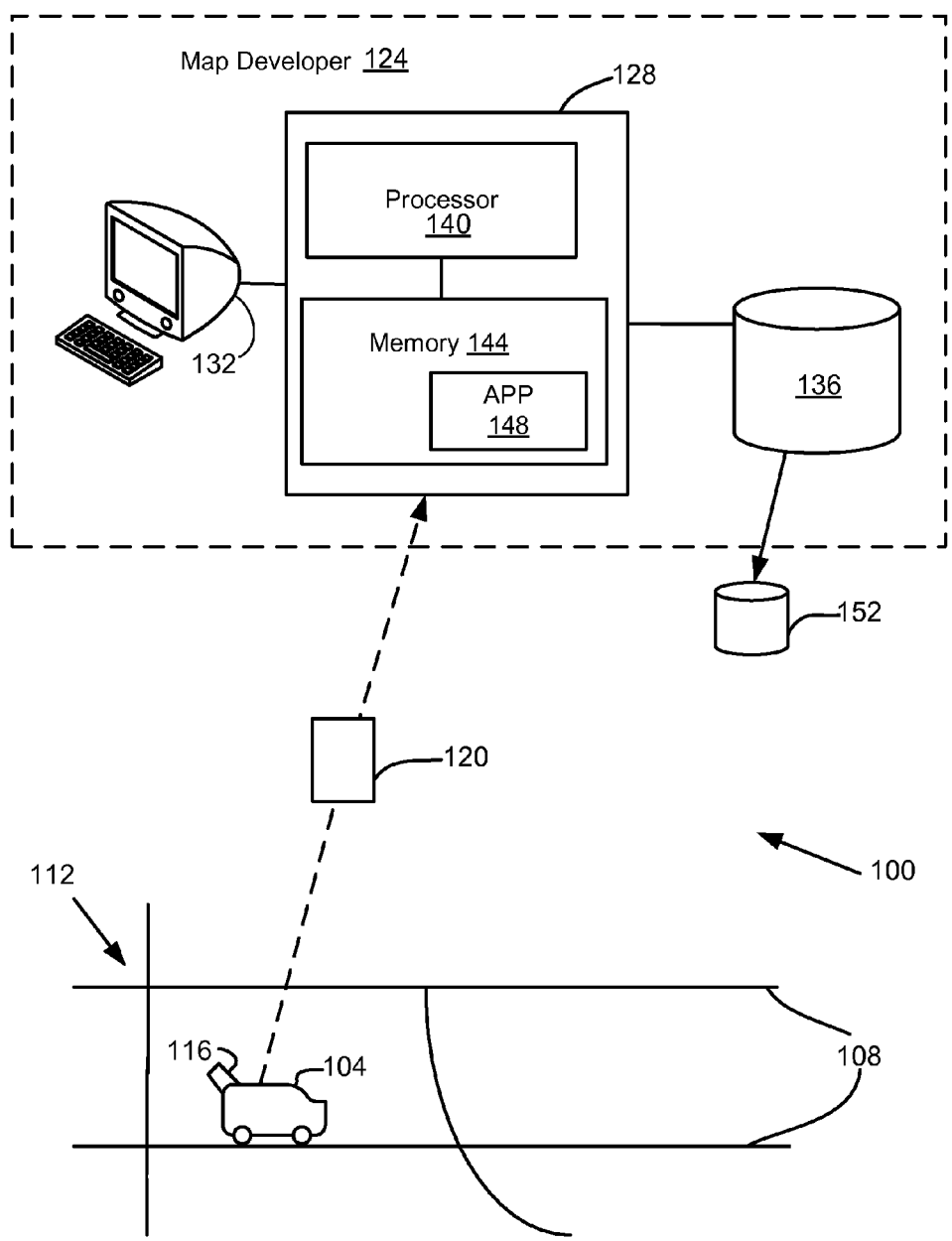
FIG. 1 is a diagram of an exemplary geographic and/or navigation data system.

FIG. 1 shows one embodiment of a geographic and/or navigation data system 100. The geographic data or navigation system 100 includes, but is not limited to, an object 104 travelling on a path network 108 in a geographic region 112, a device 116, a processing device 128, a workstation or computer 132, and/or a database 136. Additional, fewer, or different components may be provided. For example, a proxy server, a name server, a map server, a cache server or cache network, a router, a switch or intelligent switch, additional computers or workstations, a user interface, administrative components, such as an administrative workstation, a gateway device, a backbone, ports, network connections, and/or network interfaces may be provided. While the components in FIG. 1 are shown as separate from one another, one or more of these components may be combined.

The object 104 is a vehicle, such as a car, truck, motorcycle, bicycle, Segway, or other transportation device or mechanical device used to move on the path network 108. Alternatively, the object 104 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. Alternatively, the path network 108 may be an open area space with no specific paths or travel constraints. The path network 108 is in the geographic region 112, such as a city, a suburb, a state, a country, and/or other geographic region.

The object 104 travels along or moves about the path network 108 to collect data. A supporting device or housing 116 is attached or connected with or carried by the object 104. The supporting device 116 may be or may include equipment to collect data representing an area about or around a road or path or other area. For example, the collected data may be laser, Light Detection and Ranging ("LIDAR"), imagery, and/or video/camera data (such as in the visible spectrum or other spectrum). Other data such as location data, global positioning system ("GPS") data, and/or other geographic data may be collected.

In one embodiment, the supporting device 116 is a housing or container that is attached to or carried by a pedestrian (the object 104), and as the pedestrian is on and/or moving on a path, sidewalk, or other area, equipment, such as a LIDAR device and/or camera, in the supporting device 116 collects data. In another embodiment, the supporting device 116 is a housing or container that is attached to a vehicle, and as the vehicle is on and/or moving on a road or path, equipment, such as a LIDAR device and/or camera, in the supporting device 116 collects or gathers data corresponding to the surrounding area. Alternatively, the supporting device 116 may be the LIDAR device or camera device itself or parts thereof. The supporting device 116 may be positioned at a backend of a vehicle or object and may be angled to enhance collection. In other embodiments, the supporting device 116 may be positioned any place on a vehicle, pedestrian, or object and in any direction.

The collected data is stored on one or more computer-readable media 120, such as a CD-ROM, DVD, flash drive, hard drive, or other tangible media suitable to store data. Different types of data may be stored on the same medium 120. Alternatively, separate media 120 may be used to store separate or different types of data. In one embodiment, LIDAR or laser data, photographs (such as digital or electronic photographs), video images, and/or other image data collected by the object 104 and/or the device 116 are stored in one or more media 120. Alternatively, the media 120 may be signals carrying or having data. The collected LIDAR or image data may represent areas or regions about or around a path, road, or other area. The collected laser or LIDAR data and/or images may include geographic features, such as sky features, terrain or surrounding features, roads or paths (such as sidewalks), road or path markings (such as cross-walks or lane markings), road or path signs, points-of-interest ("POIs") such as buildings, parks, museums, etc., and/or other features or objects.

The collected image data, via one or more media 120, is sent to a map, geographic, and/or navigation data developer 124, such as NAVTEQ North America, LLC located in Chicago, Ill. For example, a medium 120 may be mailed to or brought to the map developer 124. Alternatively, some or all of the collected data may be transmitted to the map developer 124 via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 128 maintained by the map developer 124 receives the collected data. The processing device 128 is one or more servers, computers (such as a desktop tower or a laptop processing unit), processors, and/or other electronic processing systems or devices. The processing device 128 includes, but is not limited to, a processor 140, a memory 144, and an image software application 148. Additional, fewer, or different components may be provided.

The processing device 128 may include or be in communication with the workstation or computer 132. For example, the workstation 132 is a user interface, electronic console, and/or computer with one or more input devices that may be used to access, control, and/or communicate with the processing device 128 or components thereof.

The processor 140 is a general processor, application-specific integrated circuit ("ASIC"), digital signal processor, field programmable gate array ("FPGA"), digital circuit, analog circuit, or combinations thereof. In one embodiment, the processor 140 is one or more processors operable to control and/or communicate with the various electronics and logic of the processing device 128. The memory 144 is any known or future storage device. The memory 144 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 144 may be part of the processor 140. The memory 144 is operable or configured to store laser, LIDAR, and/or image data or other data.

The processor 140 or other processor is configured or adapted to execute the image software application 148, which may be stored in the memory 144 or other memory. For example, the image software application 148 generates a multi-layered image (such as a two-dimensional scalable vector graphics ("SVG") multi-layered image) based on model data, such as three-dimensional model data corresponding to a geographic area. In one embodiment, the application 148 identifies and/or receives three-dimensional model data, such as collected three-dimensional LIDAR point cloud data, and performs processes or rendering sequences, which are discussed in detail below, to generate a multi-layered graphics image of a geographic area. The generated multi-layered graphics image may be used in navigation or geographic systems as well as in a variety of user interfaces, devices, or systems. Also, the generated multi-layered graphics image may be provided to developers of such systems and/or devices for configuration purposes.

In one embodiment, one or more generated multi-layered graphics images are stored, linked, indexed, and/or associated with or in the database 136, which is in communication with the processing device 128. Alternatively, one or more generated multi-layered graphics images are stored in one or more separate or different databases that may or may not be associated with the database 136 or data thereof. In one embodiment, the geographic database 136 includes data used for navigation-related and/or geographic-related services. For example, the geographic database 136 contains road segment/link and node data records that represent a road network, such as the path network 108. A node represents an end point of a road segment and/or intersection points. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 136 contains path segment/link and node data records or other data that represent pedestrian paths in addition to or instead of the vehicle road record data.

The geographic database 136 may be a master geographic database that is stored in a format that facilitates updating, maintenance, and development. For example, the master geographic database 136 or data in the master geographic database 136 is in an Oracle spatial format, such as for development or production purposes. The Oracle spatial format or development/production database may be compiled into a delivery format, such as a GDF format.

The data in the production and/or delivery formats may be compiled or further compiled to form geographic database products or databases 152, which may be used in end user navigation devices or systems or other systems or devices. For example, a customer of the map developer 124 (such as a developer of navigation devices or systems) may receive generated multi-layered graphics images as well as other geographic data in a delivery format and then compile and/or configure such data for end user devices. In one embodiment, geographic data is compiled (such as into a PSF format) to organize and/or configure the data (e.g., segment/link, node, multi-layered graphics image, and/or other data or attributes) for performing navigation-related functions and/or services such as route calculation, route guidance, map display, speed calculation, distance and travel time functions, and other functions, by a navigation device. The navigation-related functions may correspond to vehicle navigation, pedestrian navigation, or other types of navigation.

Figure 2:
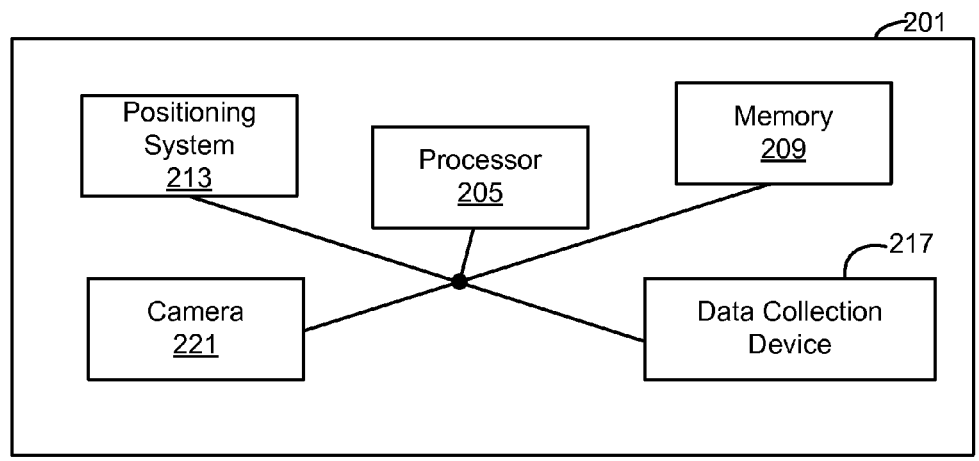
FIG. 2 illustrates an embodiment of components of a device used in the exemplary system of FIG. 1.

FIG. 2 illustrates an embodiment of components of a device 201. For example, the device 201 may be an embodiment of the object 104, such as a vehicle, or may be similar to the supporting device 116. In one embodiment, the device 201 is a support or housing that includes equipment to collect data. For example, the device 201 is removably or integrally attached or connected with a vehicle. The device 201 is positioned at a top backend of the vehicle. Alternatively, the device 201 may be positioned on or in any part of the vehicle at any angle. In another embodiment, the device 201 is attached to or carried by a pedestrian. For example, the device 201 may be a LIDAR device or other device for collecting three-dimensional data.

The device 201 includes, but is not limited to, a processor 205, a memory 209, a positioning system 213, a data collection device 217, and a camera or camera device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or on another part of the vehicle while the data collection device 217 and the camera 221 are in the device 201. The data collection device 217 and the camera 221 may also be separated into different enclosures or supports.

The processor 205 is similar to or different than the processor 140. The processor 205 is configured to operate the collection equipment, such as the positioning system 213, the data collection device 217, and the camera system 221. For example, the processor 205 sends commands to the various collection devices to collect data and synchronizes or manages the different components. Also, the processor 205 is configured to store data from the collection devices into the memory 209. The memory 209 is similar to or different than the memory 144. The memory 209 is operable or configured to store collected light, laser, LIDAR, image, and/or position data or other data. The memory 209 may be part of the computer-readable medium 120 or may be a separate memory.

The positioning system 213 is a GPS system, one or more mechanical and/or electrical sensors, one or more gyroscopes, a local positioning system, one or more direction sensors, or other system or device for providing position data, such as location data (e.g., longitude, latitude, and/or altitude) and/or direction data, of the device 201, components thereof, or an attached object, such as a vehicle.

The camera 221 is one or more cameras used for taking pictures or videos of a surrounding area. For example, the camera system 221 includes a video camera that records video data (such as in the visible light spectrum) representing geographic features of and about a road or path as a vehicle drives along the road or path. The camera 221 may also capture still photographs separate from the video data. The camera 221 is able to capture different colors and associated text of geographic features.

The data collection device 217 is a light data collection device. For example the device or system 217 may include a light source and a light receiver. In one embodiment, the data collection 217 is a Light Detection and Ranging ("LIDAR") device or sensor, a laser device, and/or other device that collects data points, such as three-dimensional data, by transmitting and receiving light. For example, the data collection device 217 is a LIDAR device that uses one or more lasers to collect data points representing a surrounding area, such as an area about a road or path or other area. The LIDAR device collects and gathers data points in a point cloud, such as a 3D point cloud, in which each data point corresponds to a local coordinate, such as (x, y, z). The one or more lasers may be in a near infrared spectrum (such as about 700 nm to about 5000 nm or about 800 nm to about 2500 nm) or other light spectrum. In one embodiment, the LIDAR device is a 64 element LIDAR sensor HDL-64E from Velodyne, Inc, located in Morgan Hill, Calif. and/or a LMS200 series LIDAR sensor from SICK AG, located in Waldkirch, Germany. For example, one SICK LIDAR sensor (which may rotate at about 180° may provide fewer data points but with lower noise) and one 64 element LIDAR sensor from Velodyne (which may rotate at about 360° may provide more dense data points but with noisier data) may be used.

Figure 3:
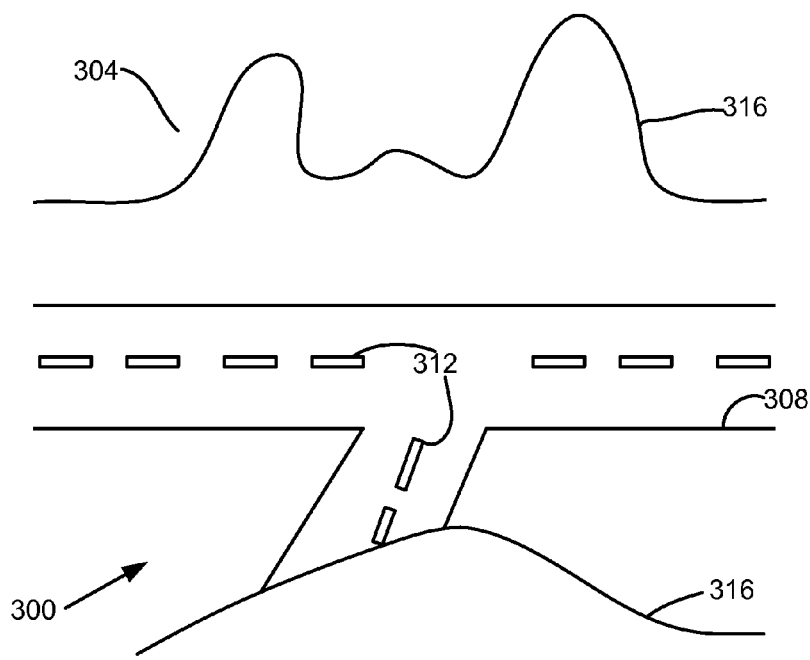
FIG. 3 illustrates an embodiment of a three-dimensional geographic model, which may be generated and/or used via the system of FIG. 1.

FIG. 3 shows an embodiment of a three-dimensional geographic model or object 300. The model or object 300 is a three-dimensional representation of a real-world geographic area, such as from a perspective view. In one embodiment, the model 300 is a three-dimensional point cloud (such as collected by the object 104 or the device 201) or modified point cloud representing different features of the geographic area. Or, the model 300 is a three-dimensional graphics model or object that is created or generated based on a three-dimensional point cloud, image data, and/or other collected data. For example, graphics, colors, images, and/or other features may be superimposed on or used to build upon a three-dimensional point cloud to generate a 3D model, or a 3D point cloud may be used as a reference to generate an independent 3D model. Alternatively, the model 300 is any three-dimensional graphics model or object that may or may not be based on data collected in the system 100 via the object 104 or the device 201.

The 3D model 300 includes representations of a sky 304, one or more paths 308, one or more path markings 312, and terrain 316 illustrating a geographic area from a perspective view. More, fewer, or additional geographic features may be provided. For example, one or more buildings, path or road signs, tunnels, POIs, and/or other features may be provided. In one embodiment, buildings, signs, POIs, and/or other features may be considered part of the terrain 316 or may be considered separate features. For example, the sky 304 is a 3D representation of a background sky or any features (such as clouds) in the sky. The path 308 is a 3D representation of a road or road network. The path markings 312 are one or more 3D representations of road markings, such as lane markings, on the road or road network. The terrain 316 is one or more 3D representations of natural terrain or surroundings (such as hills, mountains, slopes, grass, etc.) or unnatural or manmade surroundings in the geographic area. The 3D representations may include or have colors or illustrate textures that substantially match their respective real-world colors or textures. Alternatively, different colors or textures or no color (e.g., black/white) or textures may be provided.

In one embodiment, the processing device 128 receives or identifies the 3D model 300, and the image software application 148 (e.g., executed by the processor 140) uses the model 300 to generate a multi-layered graphics image. FIGS. 4-7 illustrate steps or processes to generate a multi-layered graphics image based on the model 300.

Figure 4:
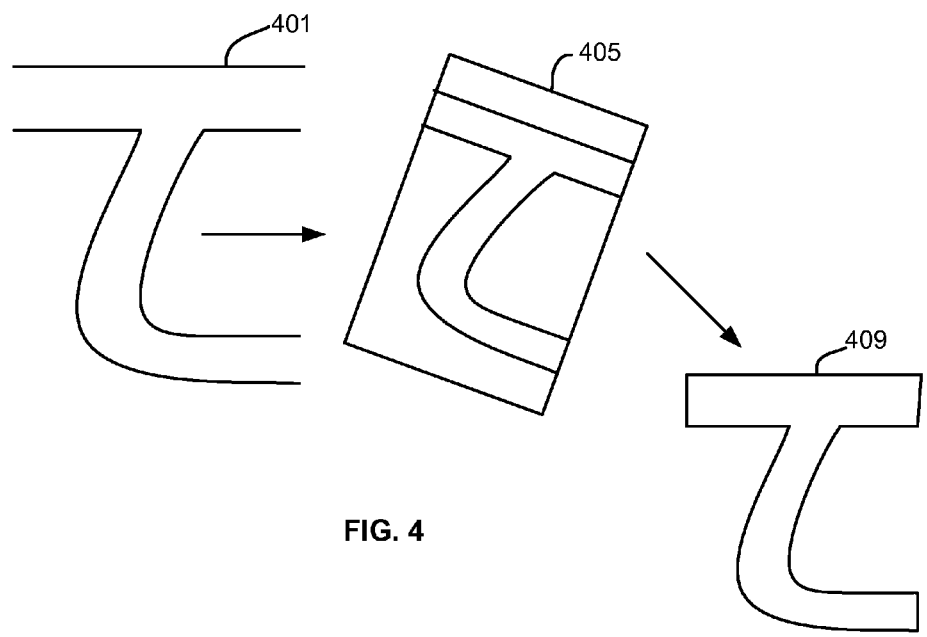
FIG. 4 is an exemplary pictorial flow diagram corresponding to rendering a graphics layer, such as from the three-dimensional geographic model of FIG. 3.

FIG. 4 is an exemplary pictorial flow diagram corresponding to a first rendering process. For example, the 3D model 300 (from the specific perspective view) is identified and all geographic features are removed except for the path or paths 308. Accordingly, a three-dimensional representation 401 (which is representation of only the path or paths 308 feature) remains. The 3D representation 401 is then projected into a two-dimensional space 405 (relative to the perspective view of the 3D model). Then, the path or road in the projected representation 405 is traced or modeled to generate a two-dimensional image 409 that represents the path or paths 308 from the specific viewpoint and area of the 3D model 300 and/or 308. The image 409 is a SVG image or other vector graphics image. Alternatively, the image 409 may be in other image formats.

Figure 5:
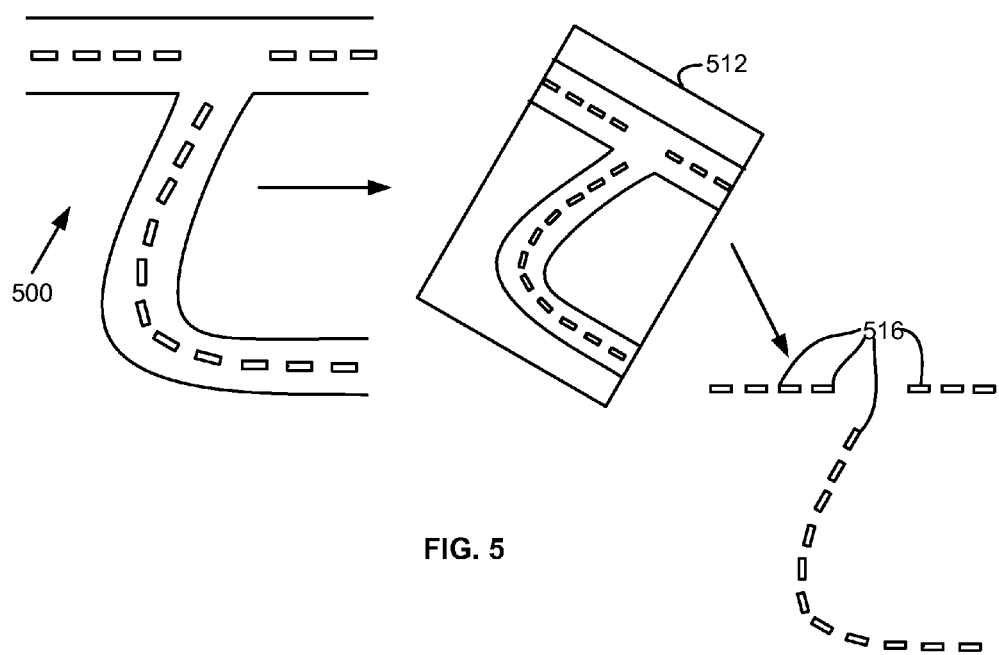
FIG. 5 is another exemplary pictorial flow diagram corresponding to rendering another graphics layer, such as from the three-dimensional geographic model of FIG. 3.

FIG. 5 is an exemplary pictorial flow diagram corresponding to a second rendering process. For example, all features except for the path or paths 308 and the path markings 312 are removed from the identified 3D model 300 (from the specific perspective view). Accordingly, a three-dimensional representation 500 (which is a representation of the path or paths 308 and the path markings 312) remains. The 3D representation 500 is then projected into a two-dimensional space 512 (relative to the perspective view of the 3D model). Then, the path or road markings in the projected representation 512 are traced or modeled to generate the two-dimensional image(s) 516 that represent the path markings 312 from the specific viewpoint and area of the 3D model 300 and/or 312. The image(s) 516 is one or more SVG images or other vector graphics images. Alternatively, other image formats may be used.

Figure 6:
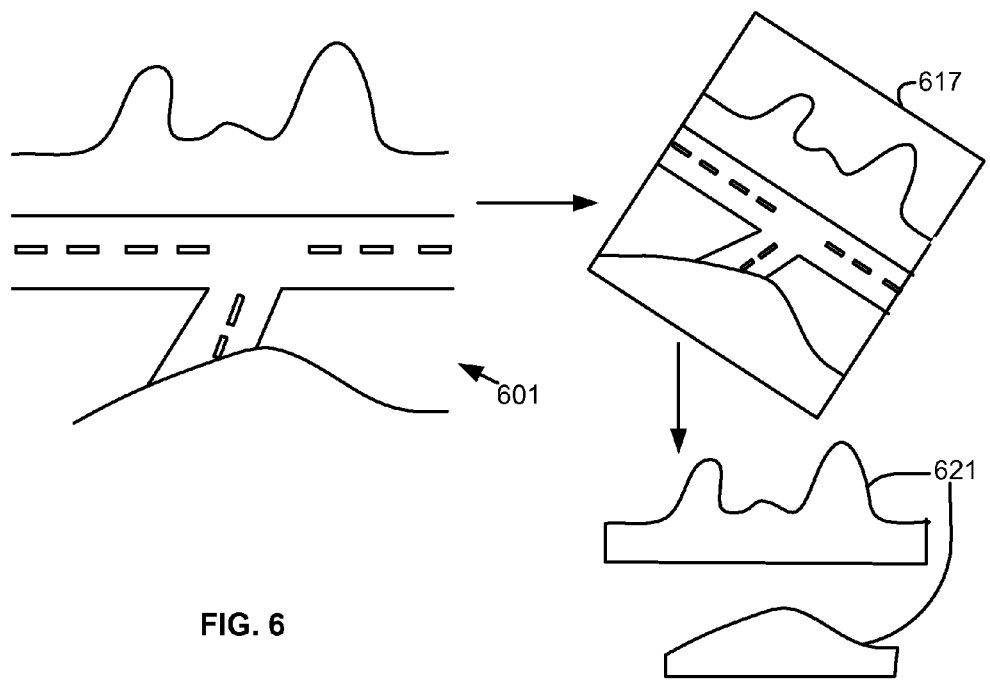
FIG. 6 is yet another exemplary pictorial flow diagram corresponding to rendering yet another graphics layer, such as from the three-dimensional geographic model of FIG. 3.

FIG. 6 is an exemplary pictorial flow diagram corresponding to a third rendering process. For example, all features except for the path or paths 308, the path markings 312, and the terrain 316 are removed from the identified 3D model 300 (from the specific perspective view). Accordingly, a three-dimensional representation 601 (which is a representation of the path or paths 308, the path markings 312, and the terrain 316) remains. The 3D representation 601 is then projected into a two-dimensional space 617 (relative to the perspective view of the 3D model). Then, the terrain in the projected representation 617 is traced or modeled to generate the two-dimensional image(s) 621 that represent the terrain 316 from the specific viewpoint and area of the 3D model 300 and/or 316. The image(s) 621 is one or more SVG images or other vector graphics images. Alternatively, other image formats may be used.

Figure 7:
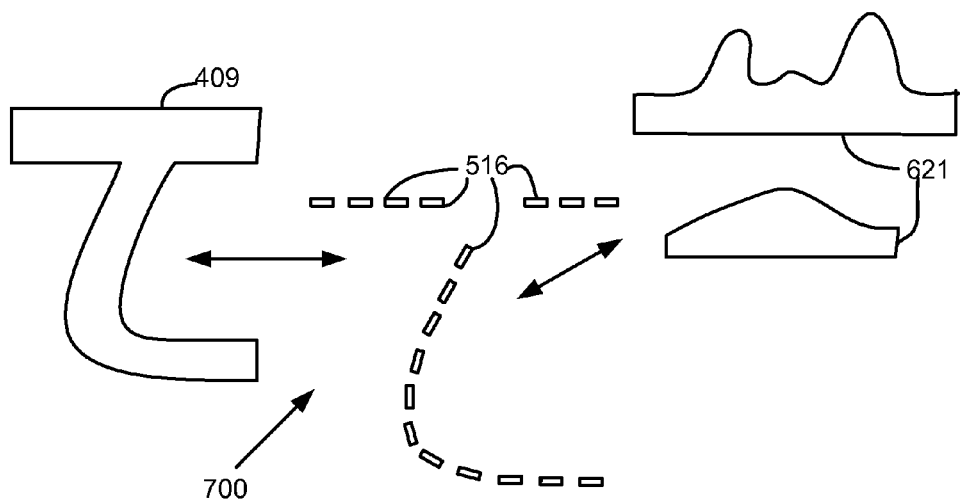
FIG. 7 is an exemplary pictorial flow diagram illustrating combining different graphics layers, such as the rendered graphics layers of FIGS. 4-6, to form a multi-layered image.

FIG. 7 is an exemplary pictorial flow diagram illustrating combining different graphics layers. For example, the generated images or image layers 409, 516, and 621 (which may be closed polygons) are combined or added together using known or future layering techniques to generate a multi-layered graphics image. In one embodiment, the generated multi-layered graphics image is a two-dimensional SVG multi-layered image that represents the 3D model 300 from the specific perspective view. Alternatively, the multi-layered graphics image may be in another vector format or other image format.

The generated multi-layered image is configured to be modified. For example, different layers may be removed, changed, swapped, and/or added. In one embodiment, in regards to the generated multi-layered graphics image, removal of layers occurs in a reverse order of their creation and avoids causing gaps within the other layers not removed. For example, the terrain layer 621 may be removed first, and if it is removed, then there will be no gaps or holes in the path layer 409 and the path marking layer 516. After the terrain layer 621 is removed, the path marking layer 516 may be removed, and if it is removed, there will be no gaps or holes in the path layer 409. In alternative embodiments, removal of graphics layer may not be dependent on the rendering or priority sequence of the respective layers. Also, a sky layer corresponding to the sky 304 is not shown. However, developing a sky layer may be provided based on the same process used to develop the other layers. In one embodiment, a sky layer may be rendered first, before the path layer 409.

Figure 8:
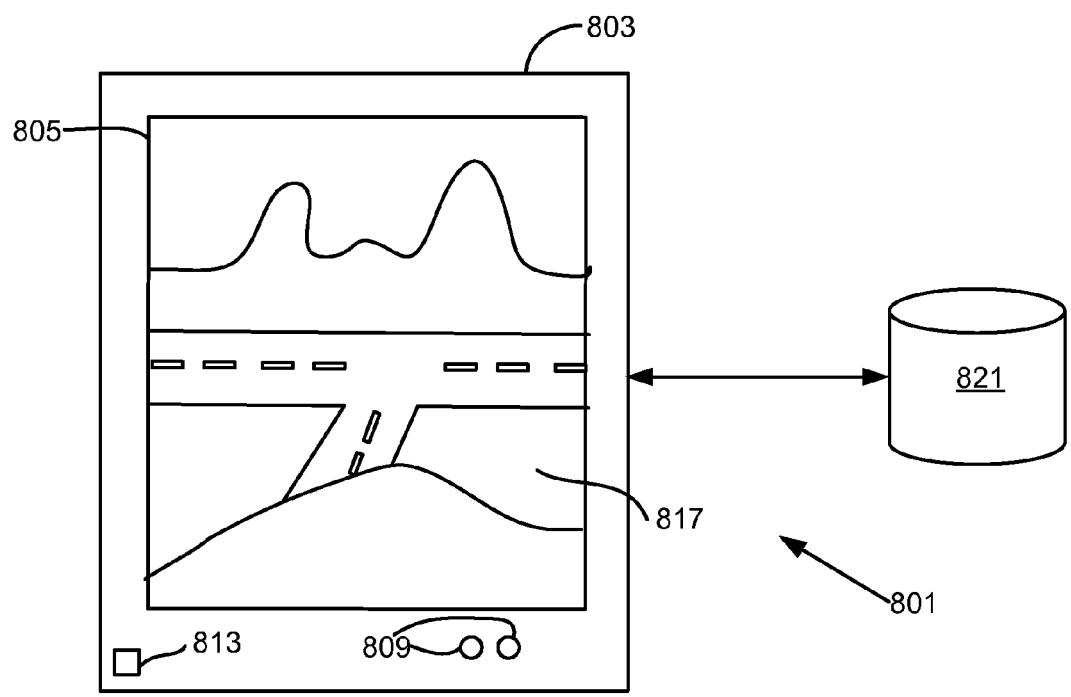
FIG. 8 illustrates an exemplary device and/or system, which may be used in regards to a generated multi-layered image.

FIG. 8 shows an exemplary system 801. The system 801 includes, but is not limited to, a device 803 and a database 821. Additional, fewer, or different components may be provided. In one embodiment, the device 803 is a user device, such as an end user device or a device used to configure map data to provide in end user devices or customer systems. For example, the device 803 is an in-vehicle navigation system, a personal navigation device ("PND"), a portable navigation device, a cellular telephone, a mobile phone, a personal digital assistant ("PDA"), a watch, a camera (or includes camera components), a computer, and/or other device that can perform navigation-related functions, such as digital routing and map display. In one embodiment, the device 803 is a cellular telephone, such as a cellular telephone provided by Nokia Corporation located in Espoo, Finland. In another embodiment, the device 803 is a computer, workstation, and/or console used by the map developer 124 or a customer thereof to configure map, geographic, and/or navigation data, such as for use in end user devices.

The device 803 includes, but is not limited to, a display 805, a dedicated input device 813, and input components or feature 809. Fewer, additional, or different components may be provided (such as a processor, memory, and/or other components). The display 805 is any mechanical and/or electronic display positioned for accessible viewing in, on, or in communication with the device 803. For example, the display 805 is a touch screen, liquid crystal display ("LCD"), cathode ray tube ("CRT") display, a plasma display, or other display. The display 805 may act as a hardware and/or software implementation of a user interface or a portion thereof. The dedicated input device 813 is a dedicated power button/switch or other dedicated input feature. The input components or feature 809 is one or more buttons, keypad, keyboard, mouse, stylist pen, trackball, rocker switch, touch pad, voice recognition circuit, or other device or component for controlling or inputting data in one or more of the components of the device 803. The input components 809 may be implemented as software inputs (such as software buttons on a screen).

The device 803 is in communication with the database 821. The database 821 is a map, navigation, geographic, and/or image database, which may be similar to or different than the database 136 and/or 152. For example, the device 803 may communicate with the database 821 via a wireless or wired network. Alternatively, the database 821 is in or part of the device 803.

In one embodiment, the device 803 retrieves image and/or map data from the database 821 to present on the display 805 (as well as perform other functions, such as navigation functions). For example, the device 803 retrieves a multi-layered graphics image 817 (which may be similar to the generated multi-layered graphics image of FIG. 7) from the database 821 and displays it. The multi-layered image 817 represents a geographic area, such as a junction view (which may be provided in a navigation application when approaching or viewing an intersection or junction of a route). A user is able to manipulate, change, and/or configure the multi-layered image 817.

For example, a customer of the map developer 124 may want to reduce the number of features in the junction view when providing an image in end user devices. Accordingly, the customer removes a terrain layer (such as the terrain layer 621) before, during, and/or after compiling data for an end user device. When the customer removes the terrain layer, there are no gaps or holes in the path/road layer, path marking layer, and/or any other layer based on the way the multi-layered image was created and its data structure. Accordingly, Painter's algorithm problems may be avoided (e.g., having holes or gaps in an underlying image portion causes additional memory storage of undesired geometry as well as additional processing used for removing, filling, and/or compensating for the holes or gaps). Other changes may be made as well. For example, colors and textures of features may be changed for different respective layers and/or portions thereof. Also, features may be swapped (e.g., the path marking pattern may be swapped out for another path marking pattern to change the look of the scene). In alternative embodiments, the device 803 may be an end user device, such as a cell phone and/or navigation device, and an end user may be able to configure and make changes to the multi-layered graphics image 817 as well.

Figure 9:
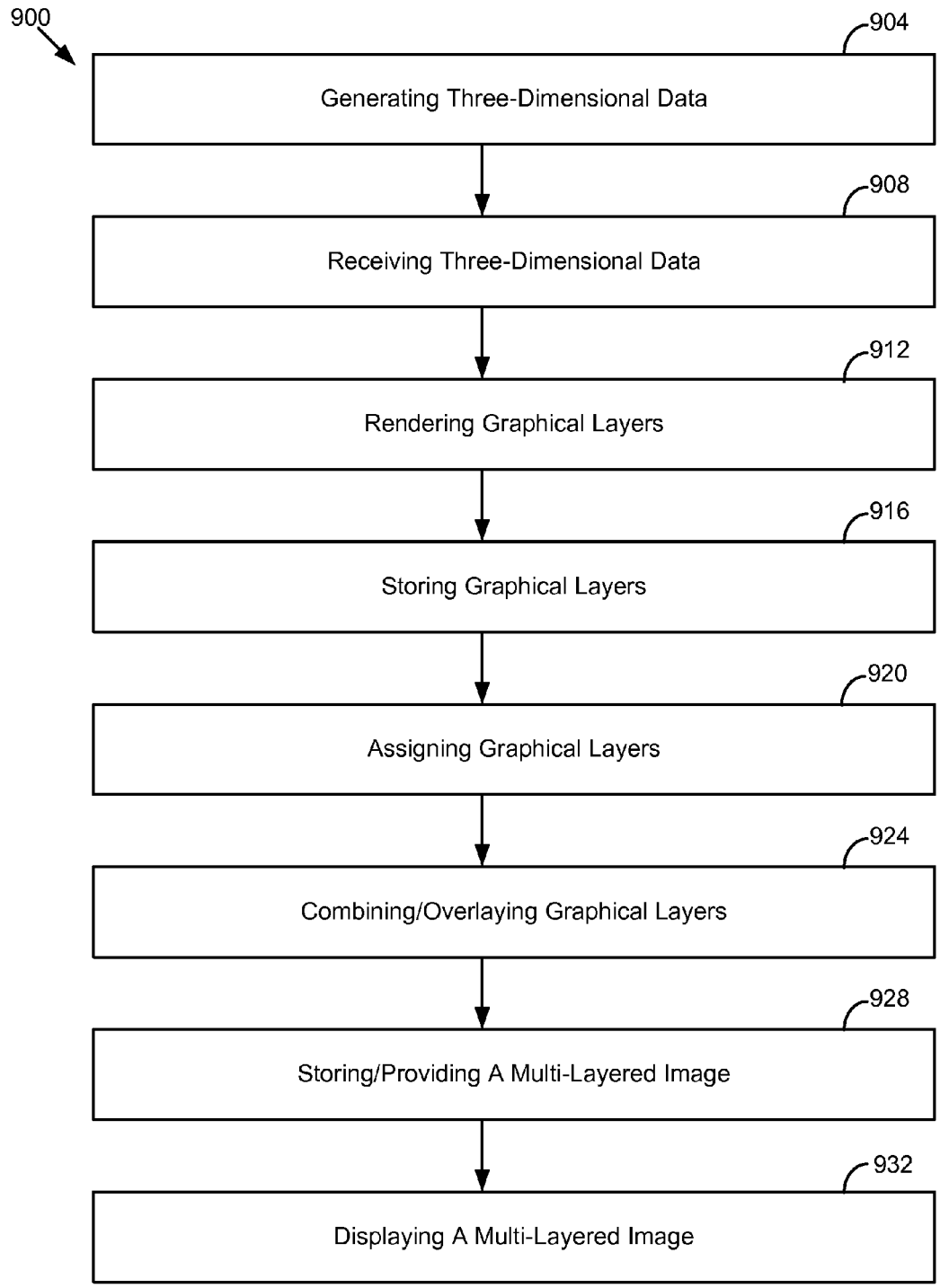
FIG. 9 is a flowchart of an exemplary method for generating a multi-layered image from a three-dimensional model of a geographic area.

FIG. 9 is a flowchart of an exemplary method 900 for generating a multi-layered image, such as the multi-layered image 817. Fewer or more steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer or algorithm).

In one embodiment, one or more three-dimensional objects, models, and/or data (such as the model 300) are generated (Step 904). For example, a map developer (such as the map developer 124) or associated parties may have geographic data collected, such as via the system 100. The geographic data collection may include capturing image data, laser or light data (such as LIDAR data), and other data. In one embodiment, three-dimensional data, such as 3D LIDAR point clouds, of one or more geographic areas are sent to one or more processing units (such as the processing device 128). The collected three-dimensional data may be the three-dimensional object or model data itself, or the collected three-dimensional data may be used to generate three-dimensional models. For example, known or future modeling techniques may be used to generate one or more 3D models of geographic areas based on collected data. In alternative embodiments, one or more 3D models may be generated based on data not acquired or collected by the map developer.

One or more of the generated three-dimensional models or objects are received and/or identified, such as by one or more devices or systems of the map developer (Step 908). For example, a 3D model or data thereof may be loaded into a memory, such as the memory 144. A processing device, such as the processing device 128 or processor 140, identifies the 3D model or a portion thereof. The identification may be based on enabling or beginning a rendering process based on logic/software of an image software application, such as the application 148.

The received and/or identified three-dimensional model or object is used to render a plurality or multiple graphics layers, such as the graphics layers 409, 516, and 621 (Step 912). For example, the image software application (which may be executed via the processor 140) uses three-dimensional model data stored in the memory to render different image layers corresponding to different or separate geographic features. In one embodiment, the identified 3D model/object data or a portion thereof is positioned in a specific perspective view (which may be based on received fixed camera parameters), such as shown via the illustration of the model 300. Then a rendering sequence is applied. The rendering sequence may be based on a specific priority order (meaning, different geographic features of the 3D model may have different priorities assigned to them). The priority may take into consideration the layering of the final multi-layered image. For example, in one embodiment, removal of layers of the final generated multi-layered image may only occur in the reverse order of creation or rendering. Alternatively, the removal of layers may occur in any other order.

For example, the map developer or customers thereof may want a specific ordering or priority in regards to the different layers because of navigation or geographic data conventions or preferences. In one embodiment, the following priority order for different geographic features is applied: one or more sky features (such as the sky 304), one or more paths (such as the path 308), one or more path markings (such as the markings 312), and one or more terrain (such as the terrain 316). More or less features may be provided in one or more different priority orders.

In one embodiment, a first rendering process step includes removing all of the geographic features or data thereof of the identified and positioned 3D model except for the sky feature. Then the remaining sky feature or one or more features in the sky are projected into a two-dimensional space, using known or future 3D to 2D projection methods. For example, the 3D view is rasterized into the 2D space, such as via pixels or pixel allocation. One or more sky features (such as clouds or other features) in the two-dimensional space are traced or outlined using known or future tracing or modeling techniques. Accordingly, one or more traced or outlined sky features are generated as a two-dimensional independent image layer. The sky image layer is in a SVG format or other vector format. Alternatively, the sky image layer may be in any other image format.

A second rendering process step includes removing all of the geographic features or data thereof of the identified and positioned 3D model except for the sky feature and the path feature (such as shown in the representation 401). Then the remaining sky and path features are projected into a two-dimensional space, using known or future 3D to 2D projection methods. For example, the 3D view is rasterized into the 2D space, such as via pixels or pixel allocation. One or more path features in the two-dimensional space are traced or outlined using known or future tracing or modeling techniques. Accordingly, one or more traced or outlined path features (such as the layer 409) are generated as a two-dimensional independent image layer. The path image layer is in a SVG format or other vector format. Alternatively, the path image layer may be in any other image format.

A third rendering process step includes removing all of the geographic features or data thereof of the identified and positioned 3D model except for the sky feature as well as the path feature and path marking feature (such as shown in the representation 500). Then the remaining sky, path, and path marking features are projected into a two-dimensional space, using known or future 3D to 2D projection methods. For example, the 3D view is rasterized into the 2D space, such as via pixels or pixel allocation. One or more path marking features in the two-dimensional space are traced or outlined using known or future tracing or modeling techniques. Accordingly, one or more traced or outlined path marking features (such as the layer 516) are generated as a two-dimensional independent image layer. The path marking image layer is in a SVG format or other vector format. Alternatively, the path marking image layer may be in any other image format.

A fourth rendering process step includes removing all of the geographic features or data thereof of the identified and positioned 3D model except for the sky feature as well as the path feature, path marking feature, and terrain feature (such as shown in the representation 601). In this step or case, no features may be left to be removed. Then the sky, path, path marking, and terrain features are projected into a two-dimensional space, using known or future 3D to 2D projection methods. For example, the 3D view is rasterized into the 2D space, such as via pixels or pixel allocation. One or more terrain features in the two-dimensional space are traced or outlined using known or future tracing or modeling techniques. Accordingly, one or more traced or outlined terrain features (such as the layer 621) are generated as a two-dimensional independent image layer. The terrain image layer is in a SVG format or other vector format. Alternatively, the terrain image layer may be in any other image format.

The generated independent image layers are stored and/or indexed (Step 916). For example, as each independent layer is created in each respective rendering step, it is stored in a memory for future processing. One or more independent image layers may be stored at substantially the same time or at different times. Known or future storing techniques may be used. The different graphical layers may be also assigned priority attributes or values (Step 920). For example, as discussed above, each independent image layer or feature it represents may have a priority associated with it regarding the order or rendering or layering (and/or associated future removal). Accordingly, one or more independent layers may be assigned or associated with a priority attribute that corresponds to the desired priority order. The priority attribute may be used for future combining of layers and/or generating a multi-layered image (such as for identification purposes). The priority attribute may be a data flag, numerical or binary value, or other indicator. The priority attribute may be assigned as an independent image layer is stored or may be assigned after storage. Known or future assigning or ID techniques may be used.

The different independent image layers, such as the layers 409, 516, and 621 and/or other layers, are combined or overlaid to generate or form a multi-layered image, such as the multi layered image 817 (Step 924). For example, the sky layer is identified, and then the path layer is layered on top of the sky layer. Then the path marking layer is layered on top of the sky and path layer, and then the terrain layer is layered on top of the sky, path, and path marking layer to make the complete multi-layered image. The order of combination or layering is based on the assigned priority attributes and/or the order of rendering. Accordingly, a configurable multi-layered graphics image (such as a SVG multi-layered image) is generated. Known or future image combination and layering techniques may be used. In one embodiment, removal of independent layers occurs in a reverse order of their creation and avoids causing gaps within, on, or in the other layers not removed and/or underlying layers. Alternatively, the removal of layers may be done in any other order without causing such gaps or holes.

The generated multi-layered graphics image is stored or provided (Step 928). For example, the generated multi-layered image is stored or associated with a geographic and/or navigation database, such as the database 136. In one embodiment, the multi-layered image is associated with specific geographic coordinates or local coordinates corresponding to a real-world location that the multi-layered image represents. For example, the multi-layered image may be linked to, stored with, or associated with one or more node and/or path segment records (e.g., the image is associated with an intersection or other point on a road network). The multi-layered image as well as other geographic data may be compiled or configured into a delivery format and provided to a map developer customer (such as a navigation device or cell phone device developer or manufacturer) in a database, such as the database 152. In alternative embodiments, one or more generated multi-layered images may be provided to customers or other entities without being associated or stored with other geographic or map data. For example, one or more generated images or image databases may be provided.

A map developer customer, such as an end-user device developer, may further compile map or geographic data to provide a navigation database in or to communicate with an end user device. One or more generated multi-layered images are used to enhance such a database and navigation experience. For example, a multi-layered image is stored or provided as navigation data for map display. In an alternative embodiment, the map developer may provide compiled map data and/or multi-layered images directly to end user devices for navigation and/or geographic related purposes.

One or more multi-layered images, such as the image 817, are displayed on a user interface (Step 932). For example, a map developer customer may display a multi-layered image for configuration purposes (e.g., to modify one or more image layers of the image before providing it to end user devices). Or, an end user device displays the multi-layered image to show a junction or other geographic area, and the end user is able to change or modify the image by changing, removing, and/or swapping one or more independent image layers of the multi-layered image.

Figure 10:
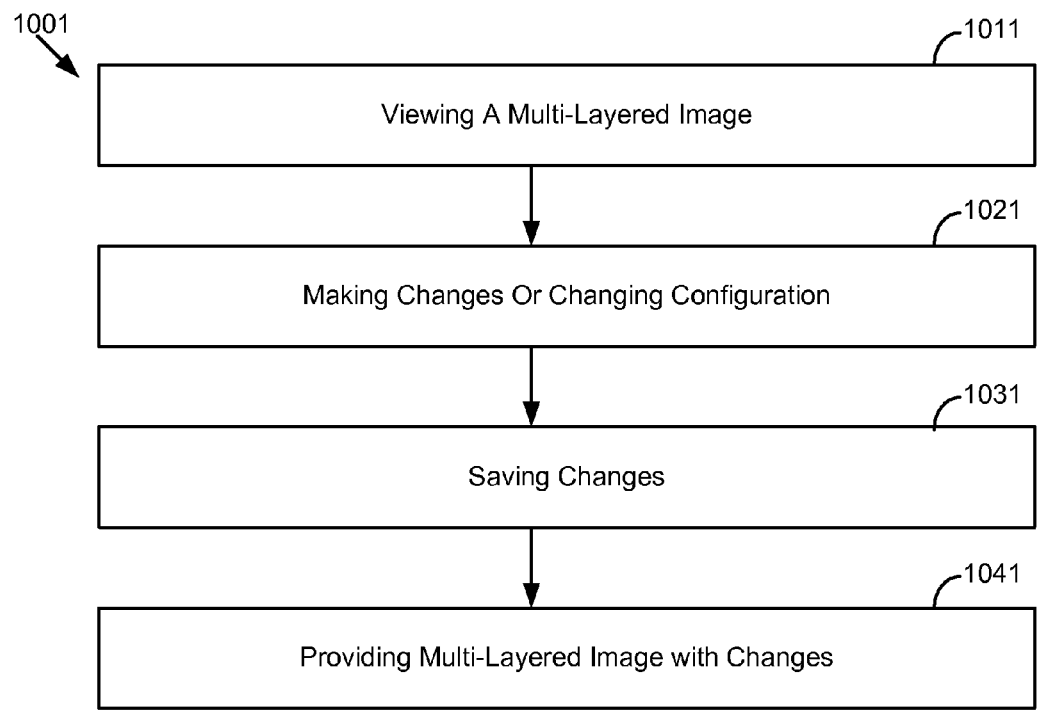
FIG. 10 is a flowchart of an exemplary method of using, changing, and/or configuring a multi-layered image.

FIG. 10 is a flowchart of an exemplary method 1001 of using, changing, and/or configuring a multi-layered image, such as the multi-layered graphics image 817. Fewer or more steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer or algorithm).

A displayed multi-layered graphics image, such as the image 817, is viewed, such as by an end user or a device developer (Step 1011). The multi-layered image is then changed or configured (Step 1021). For example, a user my want to remove terrain or other geographic features from the image. Removal of an independent image layer does not cause gaps or holes in or on other layers of the image. However, removal may occur only in a specific sequence (such as in the reverse order of rendering or based on a priority sequence) or may occur in any other order (such as a random order). Also, in addition to or instead or removing one or more image layers, one or more image layers may be changed or swapped. For example, the color or textures of independent layers may be changed by the user, or a layer may be replaced by another layer (e.g., the provided path marking layer may be replaced by a desired or preferred path marking layer representing path markings in a stylish and/or desired way, such as for aesthetic purposes).

The changes or modifications made to the multi-layered image are saved or stored (Step 1031). Then the changed or modified multi-layered image or data thereof is provided to end users or other users and/or the devices thereof for current and future use (Step 1041).

The features, components, devices, systems, acts, steps, and processes mentioned herein may be mixed and matched to provide other systems and methods embodying the ideas disclosed.

Alternatives

The embodiments described herein focus on using a 3D data model to generate a 2D multi-layered graphics image based on 3D to 2D projection techniques. However, the features described herein may be used to generate one or more 3D, 2D/3D hybrid, and/or different 2D multi-layered images based on any type of data models representing geographic or other areas. For example, projecting a 3D model feature into 2D and then tracing the feature in 2D to generate an independent layer may cause raster artifacts, such as when zooming in on an image portion. In one embodiment, when path markings and/or other geographic features are projected into a 2D space, such as by creating a raster image, and then the path markings are traced to form an independent image path marking layer, the outline of the path markings in the layer may be choppy or distorted (especially when zoomed in on) due to the rasterization and/or tracing process. Accordingly, the 3D data defining the path markings may be used with the rest of the multi-layered image instead of generating a 2D model(s) of the path marking as mentioned above. For example, the 3D data of the path marking may be retrieved and superimposed or overlaid on top of the rest of the multi-layered image using known or future 2D/3D combination techniques. The resulting multi-layered image may be a 2D image or a 2D/3D hybrid image. By doing this, more memory space and/or processing may be used, but it does reduce problems, such as raster artifacts.

Furthermore, the multi-layered image and the respective independent layers thereof are described as SVG or vector images above. However, the independent image layers and/or the multi-layered image may be a combination of vector images and raster images (such as a bitmap, JPEG, GIF, and/or other image format). Or, the multi-layered image and the respective independent layers thereof may be in a raster image format or other image format that allows grouping and/or layering of image features for configuration and changes (such as removal capabilities).

Also, the changes and modifications to the multi-layered image described above focus on a user viewing a displayed image. However, changes and modifications to one or more multi-layered images may be done without viewing the image or layers thereof on a display. For example, text based or computer code may be used to make changes that have the desired effects.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or computer-executable instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

I claim:

1. A method of creating a two-dimensional graphical multi-layered image from a three-dimensional model of a geographic area to enhance a navigation database, the method comprising:

receiving three-dimensional graphical object data that represents a geographic area, the three-dimensional graphical object including representations of a path, a path marking on the path, and terrain surrounding the path;

rendering a two-dimensional graphical layer of the path by removing the path marking and the terrain, projecting the path in a two-dimensional space, and tracing boundaries of the path, wherein rendering the two-dimensional graphical layer of the path is based on a specific perspective view of the three-dimensional graphical object;

storing the two-dimensional graphical layer of the path as a first independent image layer;

rendering a two-dimensional graphical layer of the path marking by removing the terrain, projecting the path and the path marking in a two-dimensional space, and tracing boundaries of the path marking, wherein rendering the two-dimensional graphical layer of the path marking is based on the specific perspective view;

storing the two-dimensional graphical layer of the path marking as second independent image layer;

rendering a two-dimensional graphical layer of the terrain by projecting the path, the path marking, and the terrain in a two-dimensional space, and then tracing boundaries of the terrain, wherein rendering the two-dimensional graphical layer of the terrain is based on the specific perspective view;

storing the two-dimensional graphical layer of the terrain as a third independent image layer; and adding the first image layer, the second image layer, and the third image layer together to generate the two-dimensional multi-layered image, the two-dimensional multi-layered image configured to be displayed.

2. The method of claim 1, wherein the three-dimensional graphical object further including a representation of a sky, the method further comprising:

rendering a two-dimensional graphical layer of the sky by removing the path, the path marking, and the terrain, then projecting the sky in a two-dimensional space, and tracing boundaries of the sky, wherein rendering the two-dimensional graphical layer of the sky is based on the specific perspective view;

storing the two-dimensional graphical layer of the sky as another independent image layer;

adding the independent image layer of the sky with the first image layer, the second image layer, and the third image layer to generate the two-dimensional multi-layered image.

3. The method of claim 1, wherein the two-dimensional graphical layer of the path is rendered first, then the two-dimensional graphical layer of the path marking is rendered second, and then the two-dimensional graphical layer of the terrain is rendered third.

4. The method of claim 3, wherein the order of rendering and adding the independent image layers is based on a priority sequence in which removal of layers occurs in a reverse order of their creation and avoids causing holes within the other layers not removed.

5. The method of claim 1, wherein each independent image layer includes closed polygons.

6. The method of claim 1, wherein projecting the path in a two-dimensional space includes rasterizing the path in a two-dimensional image from the perspective view.

7. The method of claim 1, wherein the terrain includes one or more buildings or man-made structures.

8. A non-transitory computer-readable medium including computer-executable instructions for creating a two-dimensional graphical multi-layered image from a three-dimensional model of a geographic area, the computer-executable instructions configured to cause a processor to perform:
    receiving three-dimensional graphical object data that represents a geographic area, the three-dimensional graphical object including multiple geographic features;
    rendering a first two-dimensional graphical layer of a first geographic feature of the three-dimensional graphical object as a first independent image layer, the rendering of the first independent image layer is based on a specific perspective view of the three-dimensional graphical object;
    rendering a second two-dimensional graphical layer of a second geographic feature of the three-dimensional graphical object as a second independent image layer, the rendering of the second independent image layer is based on the specific perspective view; and
    combining the first independent image layer and the second independent image layer as a function of the rendering to create the two-dimensional graphical multi-layered image,
    wherein the order of rendering the first independent image layer and the second independent image layer is based on a priority sequence in which removal of layers occurs in a reverse order of their creation and avoids causing gaps within the other layers not removed,
    and wherein the two-dimensional graphical multi-layered image is displayed as a navigation feature.

9. Non-transitory computer-readable medium of claim 8, wherein the multiples geographic features include one or more features consisting of: a sky, a path, a path marking, and a terrain.

10. Non-transitory computer-readable medium of claim 8, further comprising:
    rendering a third two-dimensional graphical layer of a third geographic feature of the three-dimensional graphical object as a third independent image layer, the rendering of the third independent image layer is based on the specific perspective view;
    combining the third independent image layer with the first independent image layer and the second independent image layer,
    wherein the order of rendering the third independent image layer is also based on the priority sequence.

11. Non-transitory computer-readable medium of claim 10, wherein the first independent image layer corresponds to a path, the second independent image layer corresponds to a path marking, and the third independent image layer corresponds to a terrain.

12. Non-transitory computer-readable medium of claim 8, wherein rendering the first independent image layer includes projecting the first geographic feature without the second geographic in a two-dimensional space, and then tracing boundaries of the first geographic feature based on the two-dimensional projection.

13. Non-transitory computer-readable medium of claim 12, wherein projecting includes creating a raster image.

14. Non-transitory computer-readable medium of claim 8, wherein the specific perspective view is based on received fixed camera parameters.

15. Non-transitory computer-readable medium of claim 8, wherein the two-dimensional graphical multi-layered image comprises a multi-layered scalable vector graphics image.

16. A method of creating a multi-layered image from a three-dimensional model of a geographic area, the method comprising:
    receiving three-dimensional graphical object data that represents a geographic area, the three-dimensional graphical object including multiple geographic features;
    rendering a first graphical layer of a first geographic feature of the three-dimensional graphical object as a first independent image layer;
    rendering a second graphical layer of a second geographic feature of the three-dimensional graphical object as a second independent image layer; and
    overlaying the first graphical layer and the second graphical layer to form the graphical multi-layered image, wherein removal of a layer avoids causing a hole in any other layer.

17. The method of claim 16, wherein the first graphical layer and the second graphical layer are scalable vector graphics layers.

18. The method of claim 16, wherein the three-dimensional graphical object data corresponds to a roadway or pathway junction.

19. The method of claim 16, wherein the first geographic feature corresponds to a path and the second geographic feature corresponds to a path marking.

20. A method of creating a graphical multi-layered image from a three-dimensional model of a geographic area to enhance a navigation database, the method comprising:
    receiving three-dimensional graphical object data that represents a geographic area, the three-dimensional graphical object including multiple geographic features;
    rendering a first graphical layer of a first geographic feature of the three-dimensional graphical object as a first independent image layer;
    assigning a first priority attribute to the first independent image layer;
    rendering a second graphical layer of a second geographic feature of the three-dimensional graphical object as a second independent image layer;
    assigning a second priority attribute to the second independent image layer; and
    combining the first independent image layer and the second independent image layer to form the graphical multi-layered image, wherein combining includes ordering the first independent image layer and the second independent image layer based on the first and second priority attributes,
    wherein the first and second priority attributes correspond to a priority sequence in which removal of layers occurs only in a reverse order of creation.

21. A method of creating a two-dimensional graphical multi-layered image from a three-dimensional model of a geographic area to enhance a navigation database, the method comprising:
- receiving three-dimensional graphical object data that represents a geographic area, the three-dimensional graphical object including representations of a path, a path marking on the path, and terrain surrounding the path;
- rendering a two-dimensional graphical layer of the path by removing the path marking and the terrain, projecting the path in a two-dimensional space, and tracing boundaries of the path, wherein rendering the two-dimensional graphical layer of the path is based on a specific perspective view of the three-dimensional graphical object;
- storing the two-dimensional graphical layer of the path as a first independent image layer;
- rendering a two-dimensional graphical layer of the path marking by removing the terrain, projecting the path and the path marking in a two-dimensional space, and tracing boundaries of the path marking, wherein rendering the two-dimensional graphical layer of the path marking is based on the specific perspective view;
- storing the two-dimensional graphical layer of the path marking as second independent image layer; and
- adding the first image layer, a second image layer, and a third image layer together to generate the two-dimensional multi-layered image.

* * * * *